T. C. CRENSHAW.
Breast Strap-Slide.
No. 165,214. Patented July 6, 1875.
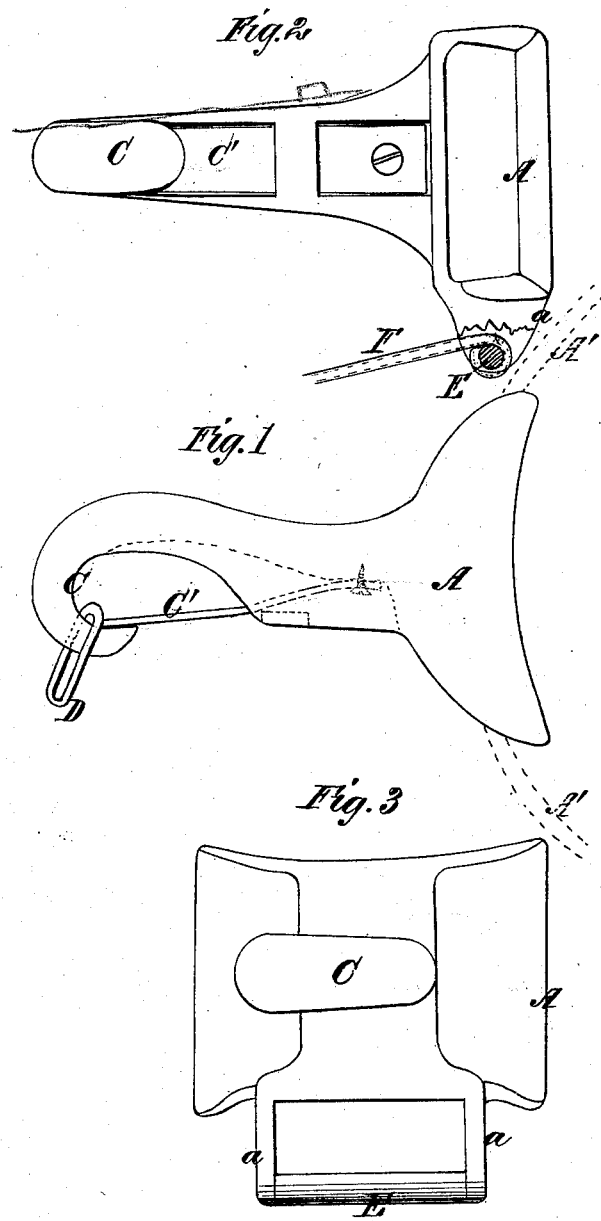
Witnesses:
Inventor:
Thomas C. Crenshaw
by
Mason, Fenwick & Lawrence
Att'ys

UNITED STATES PATENT OFFICE.

THOMAS C. CRENSHAW, OF LEXINGTON, ASSIGNOR OF ONE-HALF HIS RIGHT TO COTTON H. ALLEN, OF ST. LOUIS, MISSOURI.

IMPROVEMENT IN BREAST-STRAP SLIDES.

Specification forming part of Letters Patent No. 165,214, dated July 6, 1875; application filed December 26, 1874.

*To all whom it may concern:*

Be it known that I, THOMAS C. CRENSHAW, of Lexington, in the county of La Fayette and State of Missouri, have invented a new and useful Combined Harness Breast-Strap Slide, Snap, and Martingale-Bar; and I do hereby declare that the following is a full, clear, and exact description thereof, reference being had to the accompanying drawing, making part of this specification, in which—

Figure 1 is a top view, Fig. 2 a side view, and Fig. 3 a front view, of my invention.

The nature of my invention consists in a tubular slide, which is fitted upon a breast-strap of harness, so as to slide thereon to the right and left, furnished with a snap-hook projecting from its front side, and with a martingale bar or loop projecting from its bottom edge, as presently described.

A represents the slide, and A' a breast-strap. C and C' is the snap-hook; D, the yoke-ring; E, the martingale-bar; F, the martingale. The slide is made tubular, so as to permit the breast-strap to pass through it. The martingale-bar is supported by end lugs $a\ a$, cast on the bottom of the slide. The hook is of the usual construction, and is cast upon the front of the slide, and has a spring or moving portion, C', which permits an entrance into the hook, and confines the ring of the neck-yoke, or of a chain.

The martingale-bar may be cast with or riveted to the slide. I prefer, however, to cast the whole in one piece, except the spring or movable piece C'.

The use of the snap or slide does away with the necessity of taking the breast-strap from any part of the harness when detaching the horses from the wagon, and thus saves time and trouble, and permits the strap to be of one foot less leather. It is only necessary to open the snap-hook to detach the ring of the neck-yoke. The tubular slide allows the snap-hook to move to the right or left on the breast-strap, and thereby relieves the horses from sudden jerks of the tongue when passing over rough ground. The martingale-bar saves the trouble of handling the martingale so often, and holds it in place, keeping it with the breast-strap, and by its use but one foot and a half of leather is required to make the martingale.

What I claim as new is—

The breast-strap slide A, snap-hook C and C', and the martingale-bar E, constructed and combined substantially as described, and for the purpose set forth.

THOMAS C. CRENSHAW.

Witnesses:
W. F. KERDOLFF,
J. R. DAVIS.